May 5, 1959   J. P. BRUCK   2,885,122
AGITATOR FOR LOOSE MATERIAL DISTRIBUTOR
Filed Feb. 3, 1958
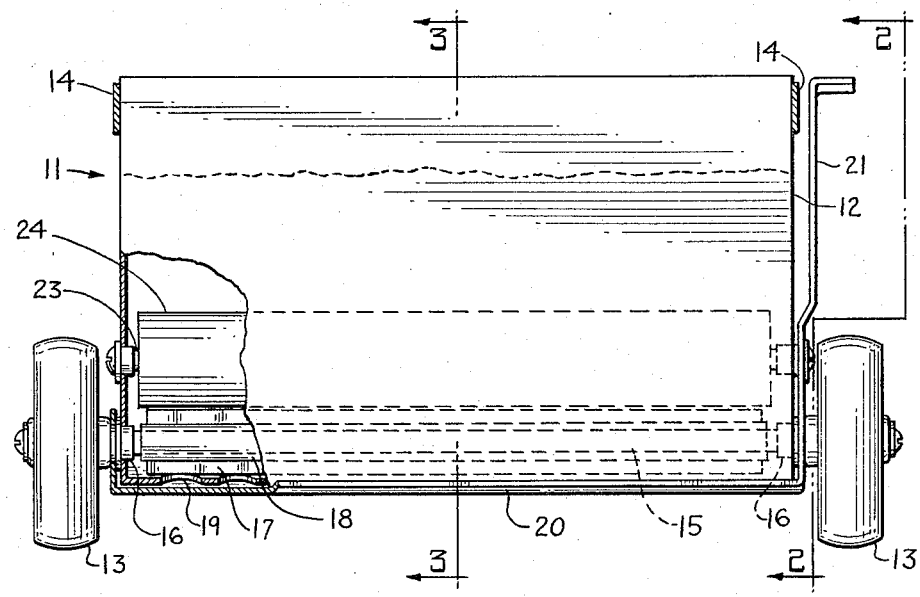
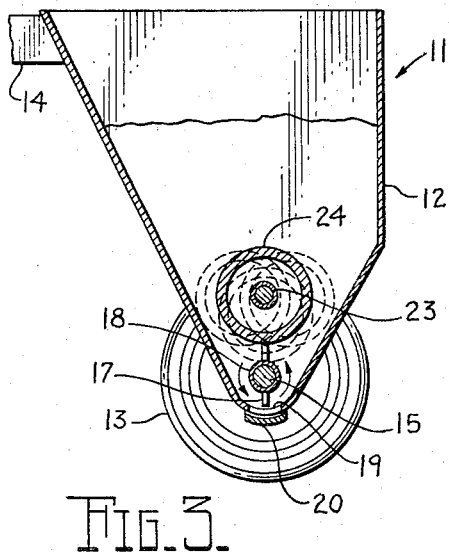
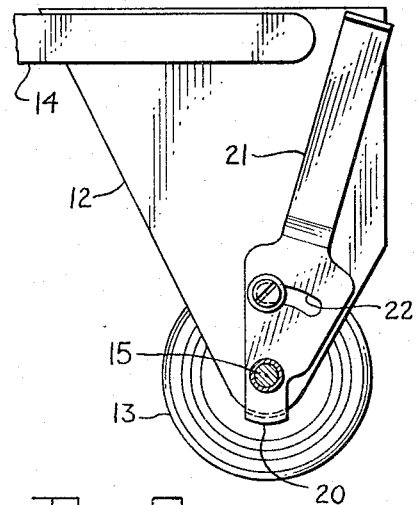
INVENTOR.
JOHN P. BRUCK
BY Owen & Owen
ATTORNEYS

United States Patent Office 2,885,122
Patented May 5, 1959

2,885,122

AGITATOR FOR LOOSE MATERIAL DISTRIBUTOR

John P. Bruck, Toledo, Ohio, assignor to American-Lincoln Corporation, Toledo, Ohio, a corporation of Ohio Application February 3, 1958, Serial No. 713,035

4 Claims. (Cl. 222—177)

This invention relates to material distributors and more particularly to a spreader for dry or moist powdery cleaning material or the like for spreading over rugs or other large surfaces, which spreader has a novel agitating means for preventing caking or agglomeration of the material and which during operation guarantees a continous flow or distribution of the material.

Spreaders or distributors for various materials, particularly for fertilizer, and, on a larger scale, farm implements for spreading seed and fertilizer, are well known in the art. The problem of caking of the material to be distributed is equally well known. To prevent caking or agglomeration of such material, various types of rotating agitators with arms extending therefrom have been previously employed and adequately function for most powders. With some types of materials that have a large tendency to cake or stick, however, such agitators tend to bore a "cave" in the material supply so that a portion thereof forms an upper wall over the agitator and spreading mechanism. In order to distribute such material, the wall must then be poked or shaken to enable the remaining material to fall into the spreading mechanism.

The present invention proposes a loose material spreader including an agitator having more extensive and more variable movement than previous agitators, and which enables even the most difficult materials to be handled. The agitator, according to the illustrated embodiment of the invention, includes a hollow member that is free to rotate and laterally move about a stationary supporting member or rod. The agitator is actuated by a rotatable member that periodically contacts the hollow member and moves it upwardly in an irregular path. The rotating member also aids in feeding the material to distributing ports in the spreader.

It is, therefore, a principal object of the invention to provide a smple, effective agitator for a spreader that prevents caking of the most difficult material.

Another object of the invention is to provide an agitator for a spreader, which agitator is in the form of a hollow member that is free to laterally move on a supporting rod and which thereby establishes a more effective movement for agitating material that is to be spread.

Other objects and advantages of the invention will be apparent from the following detailed description of a specific embodiment thereof, reference being made to the accompanying drawing, in which:

Fig. 1 is a front view, with parts broken away, of a material spreader having an agitator embodying the principles of the invention;

Fig. 2 is a right end sectional view of the material spreader taken along the line 2—2 of Fig. 1; and Fig. 3 is a view in cross section taken along line 3—3 of Fig. 1.

An agitator according to the invention is depicted as a material spreader for cleaning rugs, in the following description and the accompanying drawing. The spreader distributes cleaning material evenly over a rug to be cleaned and the material is subsequently removed along with dirt it has picked up from the rug. However, the new agitator is equally effective for almost any other type of distributor or spreader that disperses material over a large area.

Referring to the drawings, a specific form of spreader 11 embodying the invention includes a hopper or receptacle 12 for material to be spread, supporting wheels 13, and bars 14 extending outwardly from an upper portion of the receptacle 12. The bars 14 may be connected to a suitable handle (not shown) by means of which the spreader 11 can be pushed or pulled. Larger spreaders for various other uses can be towed by a tractor or the like in which case the bars 14 are connected to a suitable tow bar. The wheels 13 support the receptacle 12 by means of an axle 15 which extends through bearings 16 located in the side walls of the receptacle 12.

Projections in the form of pins or paddles 17 are located, preferably in two diametrically opposed longitudinally extending rows, on a sleeve 18 that, in turn, is mounted on the axle 15. As the sleeve 18 rotates the pins 17 feed cleaning material or other material to a row of distributing ports 19 located in the bottom of the receptacle 12 below the axle. The effective area of the ports 19 can be varied by an elongated valve plate 20 that can partially or completely cover the ports according to the position of the plate 20 as controlled by a lever 21 pivoted around the axle 15. The lever 21 has a slot 22 to accommodate one end of a supporting member or rod 23, shown in the specific form as having a cylindrical shape. The rod 23 extends through the receptacle 12 and, in the specific form, is parallel to the axle 15.

A hollow agitating member 24, shown in the form of a cylindrical tube, is located around the rod 23 and is free to rotate on and have limited lateral movement with respect to the rod. The member 24, when in a lower position, is within the circumference of a circular path defined by the revoluble movement of the pins 17 and is successively struck by the pins as they revolve. This causes the member 24 to eratically move in a generally upward direction and in the direction of rotation of the pins 17.

In operation, the material to be distributed is placed in the receptacle 12 with the lever 21 positioned so that the valve plate 20 completely closes the ports 19. When the spreader 11 is moved over a rug or other surface onto which the material is to be distributed, the lever 21 is moved to the left, as shown in Fig. 2, so that the plate 20 exposes a portion of the ports 19. The amount of the ports that is exposed determines the concentration of the cleaning material on the rug, and the area of the ports can also be varied according to the coarseness of the material. As the spreader is moved and the wheels 13 are turned, the pins 17 are caused to revolve and feed material to the ports 19. As one of the rows of pins 17 is pushing material downwardly across the ports 19, the upper pins strike the member 24, thus moving it upwardly and loosening the material thereabove that is within reach of the member 24. Movement of the agitator member 24 is much more effective than that of a conventional agitator because a large lateral movement is obtained with the new agitator and this movement is only limited by the relationship between the inner dimension of the member 24 and the outer dimension of the rod 23. Further, the member 24 does not move in a fixed path as do conventional agitators but can extend in all directions around the rod 23, as indicated by the dotted lines in Fig. 3. Thus, there is no tendency to bore a "cave" in the material as is true of conventional agitators. As a portion of the material is distributed, the remaining portion moves downwardly on each side of the member 24, is caught by the pins or paddles 17, and fed to the ports 19. The member 24 is effective to loosen the material until its level falls below that of the member, at which time the agitating action of the paddles 17 is sufficient to keep the remaining material loose.

A material spreader according to the invention basically includes a material receptacle, a supporting rod extending therethrough, a hollow member located about the rod, and means for moving the hollow agitating member, which means is powered by the wheels of the spreader. More specifically, the moving means is in the form of pins or paddles affixed to the axle of the wheels and which are so located as to strike the member and throw it up when the latter is in a lower position.

I wish it understood that my invention is not limited to any specific construction, arrangement or form of parts, as it is capable of numerous modifications and changes without departing from the spirit of the depending claims.

I claim:

1. In a material distributor including a material receptacle and wheels for carrying the receptacle, the improvement which comprises a supporting rod adapted to extend across the receptacle lengthwise thereof and be supported thereby, a hollow agitating member located about said rod and having an inner dimension larger than the largest outer dimension of the rod, said member having an imperforate wall, and means actuated by a turning of the wheels for intermittently moving said hollow member transversely on the rod.

2. In a material distributor including a material receptacle and wheels for carrying the receptacle, the improvement which comprises a rod extending across the receptacle lengthwise thereof and supported thereby, a hollow imperforate tube located about said rod for limited lateral floating movements thereon, a plurality of projections arranged in not more than two rows lengthwise of the receptacle, and means powered by the rotation of said wheels for moving said paddles against said hollow member to impart said movements to the member.

3. In a material distributor including a material receptacle, wheels for carrying the receptacle, and an axle connected to said wheels to turn therewith and extending through said receptacle, the improvement which comprises a rod extending across the receptacle and supported thereby, a hollow imperforate tube located about said rod for rotary and transverse movements relative thereto, all inner dimensions of said tube being greater than the largest dimension of said rod to positively limit the transverse movements of said rod, and a plurality of projections affixed to and extending laterally from said axle, said projections being of sufficient length and so located as to strike and move said member at least occasionally when turning with the wheels.

4. Apparatus according to claim 3 in which said supporting rod is parallel to said axle.

References Cited in the file of this patent
UNITED STATES PATENTS

| | | |
|---|---|---|
| 950,086 | Wilson | Feb. 22, 1910 |
| 2,031,820 | Crawford | Feb. 25, 1936 |
| 2,710,117 | Fritz et al. | June 7, 1955 |